(12) United States Patent
Tuunanen et al.

(10) Patent No.: US 6,594,356 B2
(45) Date of Patent: Jul. 15, 2003

(54) INITIATING A CONTROLLING SERVICE

(75) Inventors: Heikki Tuunanen, Espoo (FI); Harri Ylieskola, Espoo (FI); Jari Eikkula, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/014,918

(22) Filed: Dec. 14, 2001

(65) Prior Publication Data

US 2002/0064274 A1 May 30, 2002

Related U.S. Application Data

(63) Continuation of application No. PCT/FI00/00530, filed on Jun. 13, 2000.

(30) Foreign Application Priority Data

Jun. 14, 1999 (FI) .................................................. 991360

(51) Int. Cl.⁷ .................................................. H04M 7/00
(52) U.S. Cl. .................................................. 379/221.12
(58) Field of Search ........................... 379/230, 221.08, 379/221.12; 455/414

(56) References Cited

U.S. PATENT DOCUMENTS 6,044,264 A * 3/2000 Huotari et al. ............... 455/414
6,246,758 B1 * 6/2001 Low et al. ................... 379/230
6,282,281 B1 * 8/2001 Low ............................. 379/230

FOREIGN PATENT DOCUMENTS

| EP | 873 029 | 10/1998 |
|---|---|---|
| WO | WO 96/13949 | 5/1996 |
| WO | WO 97/36431 | 10/1997 |
| WO | WO 98/04090 | 1/1998 |
| WO | WO 98/21899 | 5/1998 |
| WO | WO 98/48574 | 10/1998 |
| WO | WO 99/03251 | 1/1999 |

* cited by examiner

*Primary Examiner*—Ahmad Matar
*Assistant Examiner*—Thjuan P Knowlin
(74) *Attorney, Agent, or Firm*—Pillsbury Winthrop LLP

(57) ABSTRACT

Services controlling the same call state model are independent of each other and do not necessarily have any knowledge of each other. To make the facilities of these parallel controlling services interoperable, at least one parameter is defined, whose value indicates whether a controlling service may be initiated to control a control record, if a controlling service has already been initiated. When detecting (301) a situation triggering the initiation of a second controlling service in the control record controlling call set-up, the initiation of the second controlling service is continued (315), if the parameter allows the initiation of the controlling service.

18 Claims, 3 Drawing Sheets

INITIATING A CONTROLLING SERVICE

This application is a Continuation of International Application PCT/FI00/00530 filed Jun. 13, 2000 which designated the U.S. and was published under PCT Article 21(2) in English.

FIELD OF THE INVENTION

The invention relates to triggering an intelligent network service controlling a basic call state model at a switching point and especially in a situation where an intelligent network service has already been triggered before said triggering.

BACKGROUND OF THE INVENTION

In telecommunications networks, intelligence refers to the ability to access stored data, to process the data and to make decisions based on the data. Even the present telecommunications networks, such as the public switched telephone networks PSTN, are to some extent intelligent, since they are capable of processing stored data in routing a call, for instance. A typical 'intelligent' facility in present telecommunications networks is conditional call forwarding in which the call situation must be analysed and the call routed on according to the stored call forwarding service profile. Intelligent facilities of this kind have, however, so far been an inseparable part of the basic network and consequently, changing or adding facilities has required software updating, for instance, in all network switching centres.

An intelligent network IN is a network architecture attached to a basic network (fixed or mobile network, for example), which enables a swifter, easier and more flexible implementation and control of services. This is done by moving the control of the services away from the switching centre to a separate intelligent network functional unit which in the following will be called a service control point SCP. This way, the services can be made independent of the operation of the basic network, and the structure and software of the basic network need not be altered when services are changed or added. The network elements which manage the intelligent network interface are called service switching points SSP. An SSP is typically a network element responsible for connection set-up, e.g. a switching centre of the basic network.

A control record of a call is, in general, modelled with an incoming side call model and a terminating side call model at the switching point SSP. The incoming side call control is related to the services of the caller, i.e. A subscriber, and the terminating side call control is related to the services of the receiver of the call, i.e. B subscriber. The reason why the call must be modelled is that to be able to control call set-up at the SSP, the SCP must know the phase of the call. By means of modelling, both the SSP and the SCP know implicitly the detection points DP, i.e. the call phases and possible interaction points, at which the SCP may influence the call. A detection point is either a trigger detection point TDP or an event detection point EDP. There are two EDP and TDP types: R, i.e. 'Request', and N, i.e. 'Notification'. When the SSP makes an SCP enquiry at a detection point DP of type 'Request', call processing must be interrupted until a response is received from the SCP. With the 'Notification' type, the SSP only sends a notification at the detection point and does not interrupt call processing or wait for a response. The TDP detection points are statically defined at the SSP and they detect the event or trigger which triggers an intelligent network service when certain conditions are met.

An intelligent network service is triggered by sending a start message leading to the initiation of the service to the service control point. In response to the message, the service control point initiates a service logic, on the basis of which the SCP sends to the SSP an instruction on event detection points EDP to be reported, for instance. After receiving the instruction, the SSP arms the detection points to be reported. If the detection point of the trigger is a request-type TDP-R, a connection controlling the state model is set up and exists as long as there is an active request-type event detection point EDP-R armed by the SCP.

In present intelligent networks, only one controlling connection can be set up in one call state model. The situation is, however, about to change as the standardization of intelligent networks progresses. According to plans, it will be possible to have, in one call state model, several controlling connections (MPC, multiple point of control support) to one or more service control points in an intelligent network according to the ETSI (European Telecommunication Standard Institute) SPS3 work group and the CoreINAP (intelligent network application protocol) CS3 (capability set 3) being developed by ITU. In other words, more than one intelligent network services can provide instructions to the same call state model at an SSP. The services controlling the same state model are, however, independent of each other, and do not necessarily have any knowledge of each other. Here, the problem is that there is no mechanism to take care of the interoperability of the facilities of parallel controlling services. The problem is accentuated when services and/or switching centres supporting one controlling service according to the old technology and services supporting several parallel controlling services are used simultaneously.

BRIEF DESCRIPTION OF THE INVENTION

It is thus an object of the invention to develop a method and an apparatus implementing the method so as to solve the above-mentioned problem. The object is achieved by a method of controlling the initiation of an intelligent network service at a switching point, in which method call set-up is controlled with at least one control record; and which method is characterized by defining at least one parameter whose value indicates whether a controlling service can be initiated to control the control record, if a controlling service has already been initiated; detecting a situation triggering the initiation of a first controlling service in the control record; initiating the first controlling service; detecting a situation triggering the initiation of a second controlling service in the control record; and continuing the initiation of the second controlling service, if the parameter allows the initiation of the controlling service.

The invention also relates to an intelligent network service switching point of a telecommunications system, which is arranged to control a call with at least one control record. The switching point is characterized in that it is arranged to maintain specific data indicating whether a controlling service has been initiated to control the control record; to have access to interworking data maintained in the telecommunications system, in which at least one parameter has been defined, whose value indicates whether a controlling service can be initiated to control the control record, if a controlling service has already been initiated; and to check the parameter value in response to detecting a situation triggering the initiation of a controlling service, if the specific data indicates that a controlling service has already been initiated to control the control record.

Preferred embodiments of the method and intelligent network service switching point of the invention are set forth in the dependent claims.

The invention is based on associating to a switching point a mechanism by means of which it manages the interoperability of services controlling the same state model so that the service control point or points need not take part in it. The mechanism indicates which interworking instruction is followed at a given time, in other words, what can be done at that moment. The mechanism is preferably implemented in such a manner that the call state model is advised on whether a service can be triggered, if it is not the first controlling service. The information is preferably provided as a multiple control state of the state model, which can be influenced by the properties of the switching centre (switching point), the requirements of the service already triggered, and the requirements of the service to be triggered.

The invention provides the advantage that it enables the interworking of several controlling services. In other words, with the invention, it is possible to ensure that a triggered controlling service truly is a controlling service, and does not change into a non-controlling service owing to the influence of another service. In addition, the invention makes it possible to use services that are already initiated in a multiple control state in such a manner that the multiple control state appears to them as a single control state preventing the initiation of other services.

In a preferred embodiment of the invention, the initiation of a new controlling service while a controlling service is already initiated is influenced by a switching point property, i.e. whether the switching point supports the initiation of several services. This provides the additional advantage that new services can be used with the old switching points by preventing the initiation of several concurrent services at a switching point which does not support this function.

BRIEF DESCRIPTION OF THE DRAWINGS

In the following, the invention will be described in greater detail by means of preferred embodiments and with reference to the attached drawings, in which.

DETAILED DESCRIPTION OF THE INVENTION

In the following, the invention and its background is described using the terms of the ETS 300 374-1 CoreINAP standard and the present structure of intelligent networks, but the invention can also be used in networks implemented according to other intelligent network standards (such as ANSI, AIN or WIN) or corresponding execution platforms in which several controlling connections MPC are possible. In this application, intelligent network refers generally to a solution in which a node transferring a call, a session or packet data contacts a service control function which gives the node in question instructions affecting the transfer of the call, session or packet data. The contact by the node in question with the service switching function is based on the service trigger data in the node. Triggerings, state models and a protocol providing controls or an API (application protocol interface) between a control function and the switching node of a network characterize an intelligent network. A call, session or packet data transfer can be depicted as a state model visible to the control function, which comprises phases and detection points associated with them, in which the processing can be stopped to wait for instructions from the control function. In other words, a control record is modelled with a state model. Controls and operations can also be methods directed at call objects and event notifications associated with them. In this application, the term 'call' refers not only to a conventional call, but also to other, possibly virtual, connection states having user data transfer, such as a data session or packet data transfer. Examples of such include packet radio sessions (such as a GPRS session), VoIP (Voice IP) and multimedia sessions according to H.323.

A telecommunications system implementing the functionality of the present invention comprises not only means required to implement prior art services, but also means for maintaining the multiple control state or another corresponding parameter of a control record. Maintaining the parameter values with which the multiple control state can be defined is also considered maintaining the multiple control state. Multiple control state indicates whether a controlling service can be initiated. Present network elements comprise processors and memory which can be utilized in functions of the invention. All changes required to implement the invention can be made as added or updated software routines and/or with application circuits (ASIC).

Figure 1:
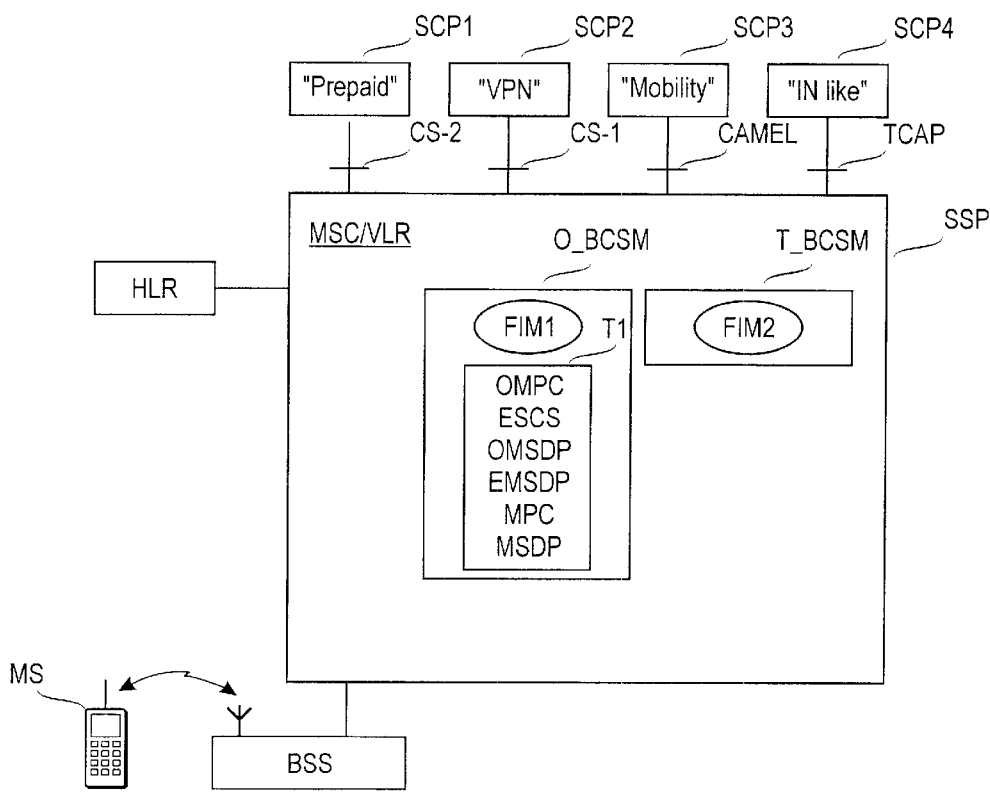
FIG. 1 shows a telecommunications system according to a first preferred embodiment of the invention.

FIG. 1 shows an intelligent network IN and the related telecommunications network architecture at a rather basic level, because the details of the network structure bear no essential significance to the invention. In the example of FIG. 1, the intelligent network is a part of a global system for mobile communications GSM so that the intelligent network service switching point SSP is also a mobile switching centre MSC of the GSM system, which also has a visitor location register VLR. The invention is, however, not in any way limited to the example in FIG. 1. The example of FIG. 1 does not describe the actual facilities of the intelligent network. They are described in connection with the network elements containing the facilities. The essential matter for the invention is the function and not the network element into which the function is located in an exemplary manner.

The structure of a GSM system comprises two parts: a base station subsystem BSS and a network subsystem NSS. The BSS and mobile stations MS communicate by means of radio connections. The base station subsystem is connected to a mobile switching centre MSC. The task of the mobile switching centre is to connect calls which include at least one mobile station MS. Some mobile switching centres MSC are connected to other telecommunications networks, such as the public switched telephone network PSTN, and they include switching functions to connect calls to and from the networks. These mobile switching centres are called gateway exchanges (not shown in the figure).

Two types of databases are associated with call routing. Subscriber information on all subscribers, including information on the services to which the subscriber has access and the current location of the subscriber, are stored permanently or semi-permanently into a home location register HLR. The second type of register is a visitor location register VLR. The visitor location register VLR is usually associated with one mobile switching centre MSC, but can also serve several switching centres. The visitor location register VLR can also be integrated to a mobile switching centre MSC. When a mobile station MS is active (it has registered into the network and can start or receive a call), a majority of the subscriber information concerning the mobile station MS in the home location register HLR is loaded (copied) into the visitor location register VLR of the mobile switching centre MSC in which area the mobile station MS is.

A network element containing a service switching function SSF and a call control function CCF is called a service switching point SSP. The call control function CCF is not a function related to the intelligent network, but a standard function of switching centres, containing high-level call processing functions, such as establishing and releasing connection paths, of the centre. The service switching function SSF is an interface between the call control function CCF and the service control function SCF. The SSF interprets the requests sent by the SCF and forwards them to the CCF which begins the call control functions required by them. Correspondingly, the call control function CCF uses the SSF to request instructions from the SCF. The SSF is tightly coupled to the CCF and acts as its interface. Thus, each SSF in the same switching centre with the CCF. In this application, the service switching point SSP is equal to the functional entity formed by the CCF and the SSF, and in the following, the term SSP is used. In the example of FIG. 1, the service switching point SSP also contains a call control agent function CCAF providing network access to the users, because it is a mobile switching centre controlling the base station subsystem BSS of a mobile network PLMN. The service switching centre SSP is typically a switching centre which implements service switching functions, in other words, the identification of an intelligent network service and the initiation of interworking, but the SSP can also be another type of network element, such as a node responsible for VoIP connection set-up, e.g. an H.323 Gatekeeper.

The service switching point of the invention comprises either in or for its control record a first piece of information indicating whether a new controlling service can be initiated (i.e. triggered) to control the control record. The first piece of information is preferably a multiple control state determined on the basis of interworking data maintained in the system. In the first preferred embodiment of the invention shown in FIG. 1, the control record is modelled with state models. Each state model forms its own separate control record. The incoming side control has its own state model O_BCSM and the terminating side control has its own state model T_BCSM. Both have their own multiple control states FIM1, FIM2 whose values do not depend on the multiple control state of the other state model (i.e. control record). As already stated above, the multiple control state indicates whether new controlling services can be initiated to control the state model. In the first preferred embodiment of the invention, the state is determined according to the parameters of the actual switching centre (switching point) and the parameters associated with the service and providing instructions. When there are no parameter values, the default parameter values can be used when necessary. Even though the parameters of the actual switching centre (switching point) are usually the same in all control records of the switching centre (switching point), they are, in the first preferred embodiment, for clarity's sake located in trigger data T1 together with the service parameters. Locating them in the trigger data naturally allows them to vary at each detection point. In the first preferred embodiment, the multiple control state is defined by means of the following parameters:

OMPC is a service-related parameter whose value indicates whether the service can be initiated, if another controlling service already exists, ESCS is a service-related parameter whose value indicates whether the service prevents other controlling services from initiating while it is the controlling one, OMSDP is a service-related parameter whose value indicates whether the service can be initiated, if a controlling service has already been served at the same detection point, EMSDP is a service-related parameter whose value indicates whether the service prevents other controlling services from initiating at the same detection point where it has been served, MPC is a switching centre (switching point) related parameter indicating whether the switching centre (switching point) supports multiple controlling services, and MSDP is a switching centre (switching point) related parameter indicating whether the switching centre (switching point) supports multiple controlling services at the same detection point.

In the first preferred embodiment of the invention, the same detection point refers to an internal detection point of the call control function CCF. It is possible that two internal detection points are mapped as one external detection point, e.g. an 'InfoCollected' point. In the first preferred embodiment of the invention, this type of a point is not one and the same detection point, but two separate detection points.

The first preferred embodiment of the invention also maintains information on controlling services as what is known as specific data. By means of the specific data and the parameter values, the multiple control state has five different values in the first preferred embodiment; these values are described in connection with FIG. 2.

A network element containing a service control function SCF is called a service control point SCP. The control function can also be in the same network element as the switching function. A service control function contains all service logic and control related to the service (e.g. the database required and the service logic programs (SLP), i.e. the computer programs which implement the logical structure of a certain service, i.e. the service logic). The service control function can be just a logical function which can be seen as uniform by the service switching point SSP. It can also be implemented internally in various ways, it can be internally distributed and the service logic associated with it can be distributed in different nodes. The service data can also be distributed in different network nodes than the service logic. For instance, the service control function or point (SCF/SCP) can be distributed internally so that it only offers an open interface (e.g. CORBA, common object request broker architecture) to an external server provided by an external service provider. In this case, the SCP and the external server form the service control function together. In this application, the SCF and the SCP are equal, and in the following, the term SCP is used. In connection with an intelligent network service, a service logic program is initiated at the service control point SCP, the operation of the service logic program determining the instructions that the SCP sends to the SSP in each call phase. The example of FIG. 1 contains four different service control points: SCP1 which provides a prepaid service for customers paying in advance; SCP2 which provides a virtual private network VPM service enabling the use of private numbers; and SCP3 for mobility management. Since SCP4 provides intelligent network-like services, it can be ranked in the same category with the service control point in this application. IN-like services are ones using the control principles of the intelligent network. In principle, these services differ from intelligent network services only in that there is no intelligent network protocol between the SCF and the SSF. In this application, an intelligent network service also covers IN-like services.

Other intelligent network services not shown in FIG. 1 are a service data function SDF, a specialised resource function SRF, and a service management function SMF. The SDF is a database used by the SCF. The service logic programs can make enquiries and update the data in the SDF. Subscriber-specific or service number-specific data, for instance, can be stored in the SDF. The SDF can be either a database management system at the service control point SCP or a separate database point. The SMF manages data related to the users and the network in the database, the data including service-specific data and service programs. The SRF is an interface for network mechanisms related to interaction with the subscriber. The SRF can interface with intelligent peripherals IP containing speech processing functions that are more advanced than those in switching centres, or it can reside at the service switching point SSP. In addition, the intelligent network services are developed, tested and deleted with special equipment called a service creation environment point (SCEP).

In FIG. 1, the network elements are linked together by means of a signalling network SS7. Other networks, such as ATM, IP, can also be used. The SSP uses various protocols with different SCPs in the example of FIG. 1. This is done for the purpose of emphasizing the fact that the multiple control state is defined independent of the protocol. In the example of FIG. 1, the CoreINAP CS2 (capability set 2) standardized by ITU is used between the SSP and the SCP1. The CoreINAP CS1 (capability set 1) is used between the SSP and the SCP2. The CAP protocol (CAMEL application part) according to the CAMEL (customised applications for mobile network enhanced logic) intelligent network standard developed for mobile systems, is used between the SSP and the SCP3. The TCAP protocol (transaction capabilities application part) which is a protocol according to the TCAP layer below the INAP layer on top of the SS7 protocol stack, is used between the SSP and the SCP4.

Figure 2:
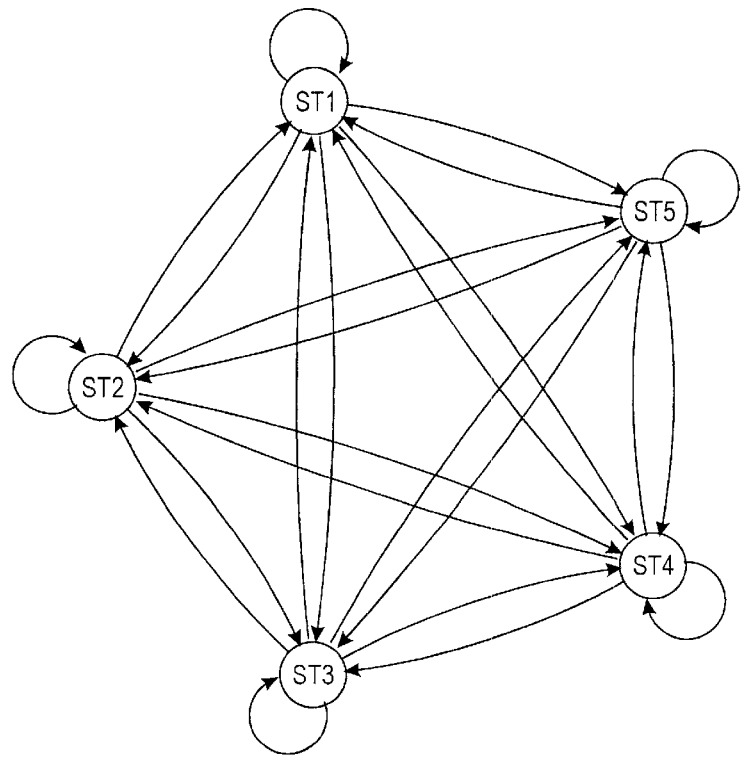
FIG. 2 shows a state model of a multiple control state according to the first preferred embodiment of the invention.

FIG. 2 shows a state model of the multiple control state in the first preferred embodiment. In the first preferred embodiment, each call model is in one of the control states shown in FIG. 2. As can be seen in FIG. 2, it is possible to move from each state to another. In the first preferred embodiment, there are five multiple control states. In which state the multiple control state is, depends on the parameters of the switching centre and on whether any controlling services are initiated and/or active, and if yes, what is the effect of the service on the parameter values.

The parameters MPC, MSDP, ESCS and EMSDP can have two values and the parameters OMPC and OMSDP three values in the first preferred embodiment. If the value of the parameter MPC is 'true', the switching centre supports several concurrent controlling connections. Correspondingly, if the value of the parameter MSDP is 'true', it is possible to have several concurrent connections at the same detection point. If ESCS is 'true', no service is preventing other services from initiating. Correspondingly, if EMSDP is 'true', no service is preventing other services from initiating at the same detection point. If the value of the parameter OMPC or OMSDP is 'always', the values of the parameters ESCS and EMSDP are of no concern. If the OMPC value is 'maybe', the values of the parameters ESCS and EMSDP affect the initiation of the service. The same applies, if the OMSDP value is 'maybe'. If the OMPC or OMSDP parameter value is 'no', the service is not initiated, if there are other controlling services.

In the first preferred embodiment, specific data and prohibition data are maintained in the state model both for each state model and for each detection point. The specific data comprises the number of active controlling services and information for each detection point on how many controlling services have been triggered or served at the detection point. Prohibition data comprises information on whether a prohibition is on, and if yes, which service has set it. In other words, the ESCS and EMSDP parameter values are maintained as prohibition data.

In FIG. 2, the initiation of controlling services is freely allowed in the state ST1. This is the state in which the process usually is when no controlling services are active. If even one controlling service is active, the process is in the state ST1 when MPC, MSDP, ESCS and EMSDP are 'true'. The service is initiated if the OMPC and OMSDP value is not 'no' when another controlling service is active.

The initiation of controlling services is allowed in the state ST2, but only one controlling service is allowed at one detection point. In the state ST2, MPC, ESCS and EMSDP are 'true', but MSDP is 'false'. This state is usually reached when one controlling service has been triggered at a detection point in the first preferred embodiment. After this, no new services can be initiated at this detection point while the triggered service is active in the first preferred embodiment. In another preferred embodiment of the invention, it is possible to reach this state when a controlling service is being served at the detection point or when a detection point is armed.

In the state ST3, the initiation of conditional controlling services is generally forbidden, i.e. a service has set ESCS to 'false' which prevents other services from initiating. In the first preferred embodiment, this value can be on until the service which has set it is either terminated or set to monitoring. In another preferred embodiment of the invention, the prohibition may still be on even after the service is terminated. In the state ST3, MPC, MSDP and EMSDP are 'true'. The service is initiated in this state only if the OMPC value is 'always'.

In the state ST4, initiating conditional controlling services is prohibited at the same detection point. In other words, a service has set EMSDP to 'false', thus preventing other controlling services from initiating at this detection point. In the first preferred embodiment, this value can be on until the service which has set it is either terminated or set to monitoring. In another preferred embodiment of the invention, the prohibition may also be left on, even after the service is terminated. In the state ST4, MPC, MSDP and ESCS are 'true'. A service is initiated in this state only if the OMSDP value of the service is 'always'.

In the state ST5, initiating controlling services is prohibited. This state is reached when the MPC value is 'false' and one controlling service is currently active. Other parameter values have no significance in this state. No service is initiated in this state.

As is obvious from the above, the prohibitions of the states ST2 and ST5 are absolute and abided by all services. The prohibitions of the states ST3 and ST4 are ones provided by services and can be overruled by a service as explained in connection with FIG. 3. In other words, there are services which are so important that they must be triggered even though another service wants to prevent it.

The state changes of FIG. 2 always occur when a detection point is met. In other words, the state changes according to the activation, progress and termination of services.

Figure 3:
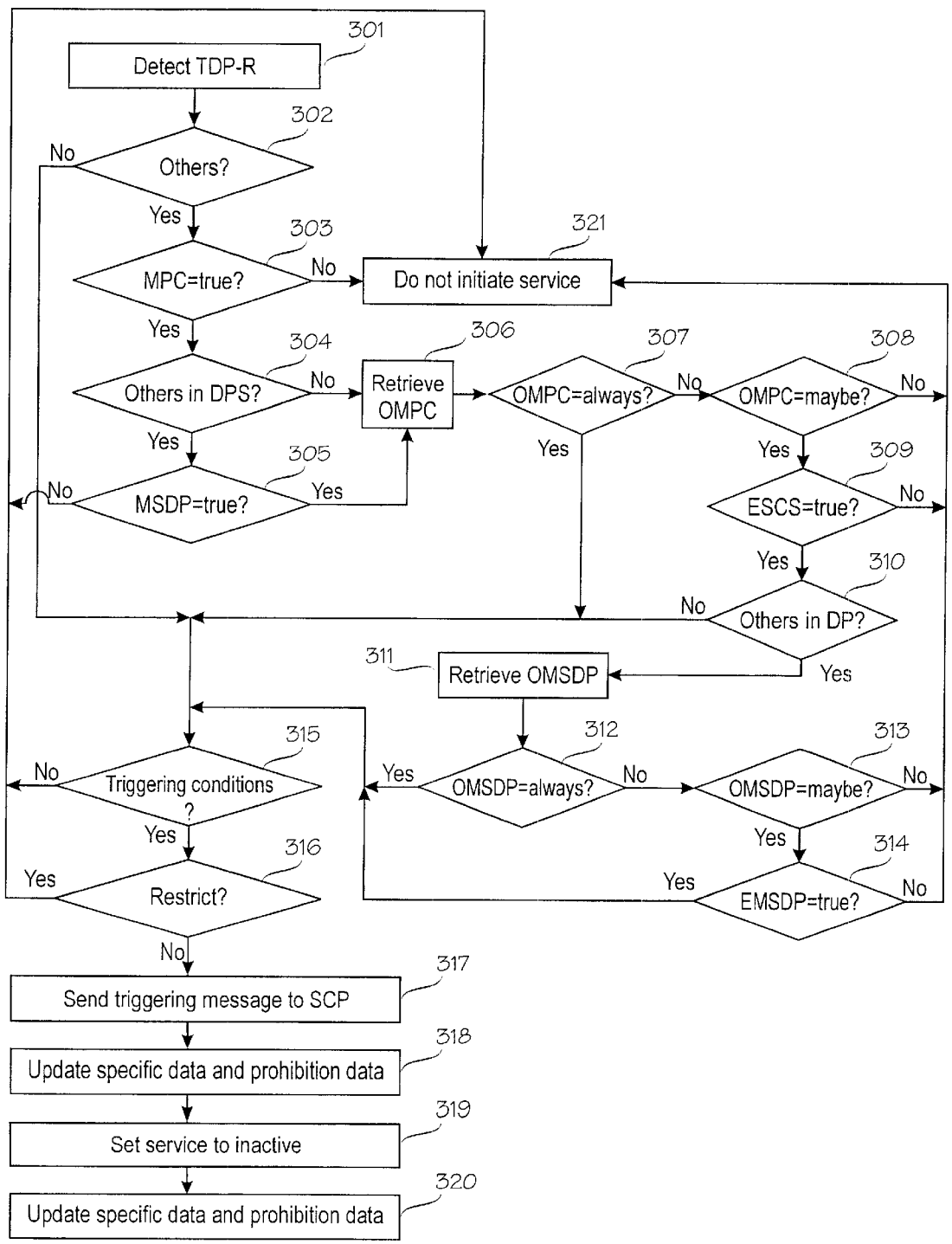
FIG. 3 is a flow chart of the first preferred embodiment of the invention.

FIG. 3 is a flowchart of the functions of a switching centre (switching point) in a first preferred embodiment. A control record (state model) has been generated for a call and the trigger detection points have been statically armed. In step 301, a trigger detection point TDP-R is detected, indicating that the service to be triggered is a controlling service. In other words, a situation initiating a controlling service is met in the control record. After this, the routine checks, if there are other controlling services active in step 302. If there are other active controlling services, the routine checks in step 303 whether MPC is 'true', i.e. are several controlling services allowed at a time. If MPC is 'true', the routine checks in step 304 whether a controlling service which is currently active has been triggered at this particular detection point DP. If yes, the routine checks in step 305 whether MSDP is 'true', i.e. are several controlling services allowed at the same detection point. If MSDP is 'true', the routine fetches in step 306 the OMPC parameter value of the service to be triggered. OMPC indicates a first special condition, on the basis of which it is possible to determine whether initiation is allowed. In step 307, the routine checks whether OMPC is 'always'. If not, the routine checks in step 308 whether OMPC is 'maybe'. If yes, the service is a conditionally initiating service and, therefore, the routine checks in step 309 whether ESCS is 'true'. In other words, the routine checks whether the active service has prohibited other services from initiating. If ESCS is 'true', such a general prohibition is not on and the service can be initiated. Since in addition to general conditions, the first preferred embodiment also uses detection point-specific conditions, the routine checks in step 310 whether this detection point DP has served or is serving other active controlling services. If yes, the OMSDP parameter value of the service to be triggered is fetched. OMSDP indicates a second special condition, on the basis of which it is possible to determine whether initiation is allowed at this particular detection point. After this, the routine checks in step 312 whether OMSDP is 'always'. If OMSDP is not 'always', the routine checks in step 313 whether it is 'maybe'. If yes, the service is a conditionally initiating service. Therefore, the routine checks in step 314 whether EMDSP is 'true'. In other words, the routine checks whether an active service has prohibited other services to initiate at this detection point. If EMSDP is 'true', there is no prohibition at the detection point and the service can be initiated if the trigger conditions are met.

In step 315, the routine checks whether the trigger conditions are met and if they are, the routine checks in step 316 whether the request is a gapping request. The purpose of gapping is to limit the number of requests directed at a given service. If the number is not exceeded, the request is not a gapping request and the service can be initiated by sending, in step 317, to the service control point SCP a message triggering the service. After the message has been sent, the specific data and prohibition data are updated in step 318. At the same time, the multiple control state may change from one state to another. For instance, the triggered service may be one preventing others from initiating, whereby the multiple control state can change from the state ST1 to the state ST3. The prohibition data is updated, if the ESCS and/or EMSDP parameter of the service prohibits other services. If the prohibition data is not prohibitive prior to the update, it is changed to prohibitive and information on the service setting the prohibition is added. If the prohibition data is already prohibitive, information on this service, too, is added to the information on the service setting the prohibition. In the first preferred embodiment, specific data is updated by the number of active controlling services, and, in addition, the detection point TDP-R is marked as the detection point at which the controlling service has been initiated. In the first preferred embodiment, the updating of step 317 is performed while the service is active by updating the detection point-specific specific data and prohibition data as the service is being served in the armed event detection points EDP. When the service changes to inactive, i.e. terminates or is set to monitoring, in step 319, the prohibition data and specific data are updated in step 320. The prohibition data is updated to non-prohibitive, if only this service is included in the information on the service setting the prohibition. If there are other services, too, this service is deleted from the information and the value remains as prohibitive. In the first preferred embodiment, the specific data is updated by the number of the active controlling services.

If the trigger conditions are not met (step 315) or the service is a gapping service (step 316), the routine moves to step 321, in which no service is initiated. If a service is not initiated, it remains at the detection point as a "sleeping service" which can be triggered, if the same detection point is met a second time. The routine then starts from step 301.

In the first preferred embodiment, if the routine detects in step 302 that there are no other active controlling services, it moves directly to step 315 to check the trigger conditions. The routine continues from there as described.

If the routine detects in step 303 that MPC is not 'true', the service is not initiated (step 321). Likewise, if the routine detects in step 305 that MSDP is not 'true', it moves to step 321.

If the routine detects in step 304 that no other active services have been served at this detection point, it moves directly to step 306 to fetch the OMPC parameter value.

If OMPC is not 'always' (step 307) or 'maybe' (step 308), its value is 'no'. This means that the service cannot operate with another controlling service and consequently, the service is not initiated. In other words, the routine moves from step 308 to step 321, if OMPC is not 'maybe'.

Correspondingly, if OMSDP is not 'always' (step 312) or 'maybe' (step 313), its value is 'no'. This means that the service cannot operate with another controlling service at the same detection point and consequently, the service is not initiated. In other words, the routine moves from step 313 to step 321, if OMSDP is not 'maybe'.

If the routine detects in step 307 that OMPC is 'always', initiation is always allowed. In other words, the value 'always' ensures that the services which must always be triggered, are triggered regardless of the prohibitions set by other services. Therefore, the routine moves directly to check the trigger conditions in step 315, and continues from there as described.

The routine also moves to check the trigger conditions in step 315 from step 310, if other active controlling services have not been served at this detection point or if the parameter OMSDP value is detected to be 'always' in step 312. The service is then one that needs not pay attention to the detection point-specific prohibitions set by other active services.

If the routine detects in step 309 that ESCS is not 'true', one of the active services has set a general prohibition on. As a result of this, the service is not initiated (step 321).

If the routine detects in step 314 that EMSDP is not 'true', one of the active services has set a prohibition on at this detection point. As a result of this, the service is not initiated (step 321).

In the first preferred embodiment, serving refers to either having initiated a new service or reported to SCP (an EDP-R or EDP-N has been detected). In another embodiment, serving may refer to only one of the above alternatives. Even arming a detection point may be regarded as serving. Thus for instance in step 310, the check may include all above-mentioned serving alternatives, two of them or just one of them.

In another embodiment, the routine may check in step 304 whether this particular detection point has served or is serving other active controlling services or whether the detection point is armed for an active controlling service.

In embodiments, in which a set prohibition remains on even though the controlling service which set it is no longer active, the prohibition data is not updated in step 320. In these embodiments, the parameters OMPC, ESCS and/or OMSDP, EMSDP are checked when the service to be initiated is not the first service of the control record being initiated. It is also possible to have embodiments, in which the prohibitions of some services remain on even though the service is no longer active and/or the prohibitions of some services are discontinued when the service is terminated or set to monitoring.

Figure 4:
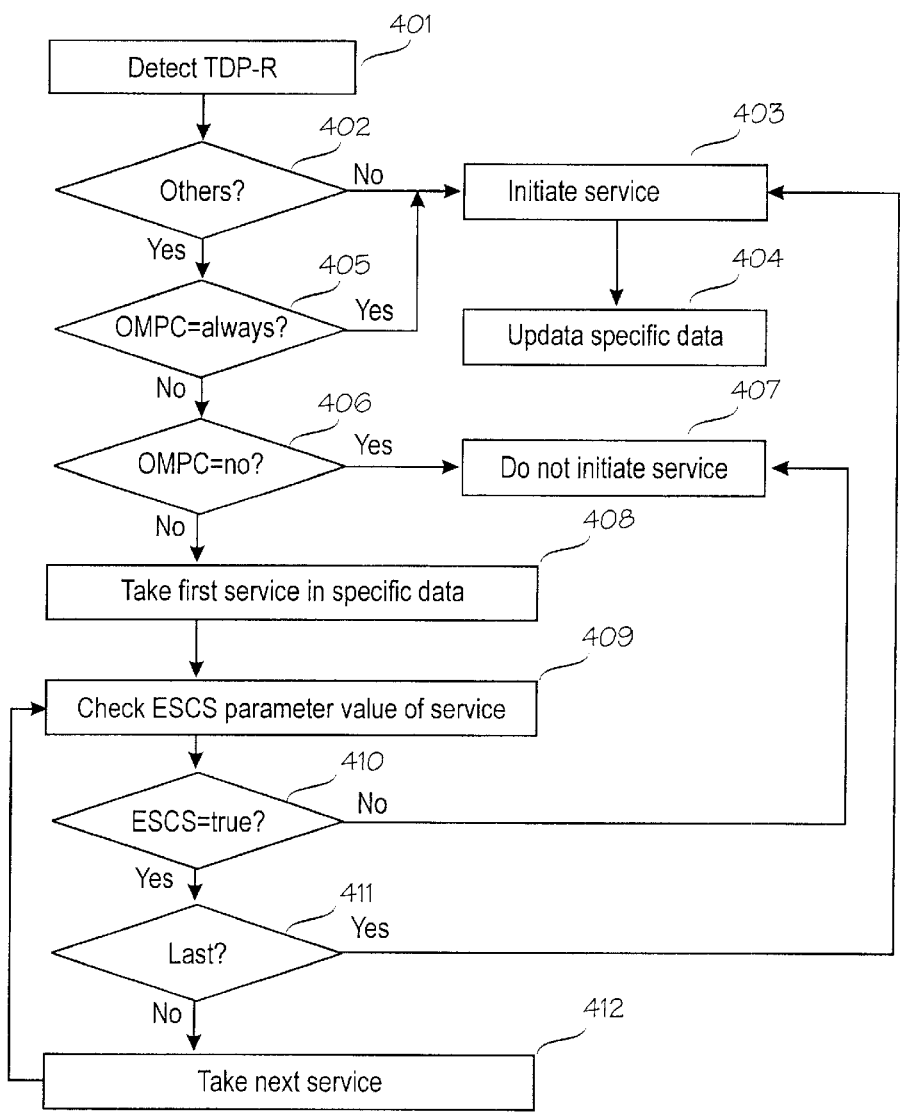
FIG. 4 is a flow chart of a second preferred embodiment of the invention.

FIG. 4 is a flowchart of the operation of a switching centre (switching point) in a second preferred embodiment of the invention. In the second preferred embodiment, the switching centre (switching point) supports several concurrent controlling services. In addition, in the second preferred embodiment, the situation is not reviewed separately for each detection point. In the second preferred embodiment, the multiple control state has two states: the states ST1 and ST3 shown in FIG. 2. In other words, a controlling service is allowed or several concurrent controlling services are allowed, if the special condition set on the service is met. The second preferred embodiment does not maintain separate prohibition data and specific data is maintained by keeping a list of active services. When there are no active services on the list, the value of the multiple control state is 1, and when there is at least one service, the value is 2.

In FIG. 4, a control record has been generated for a call and the trigger detection points have been statically tuned. In step 401, the trigger detection point TDP-R is detected. After this, the routine checks in step 402 whether there are other active controlling services (i.e. is the multiple control state 1 or 2) in the list of specific data.

If there are no other active controlling services (i.e. the multiple control state is ST1), the triggering of the service is continued as described above in connection with FIG. 3 by checking whether the trigger criteria are met, for instance. For simplicity's sake, it is assumed in FIG. 4 that the service is triggered, and consequently initiated in step 403. The specific data is updated in step 404 both when the service is initiated and when it is set to monitoring or terminated.

If other controlling services are active (the multiple control state is ST3), the routine checks in step 405 whether the OMPC parameter value of the service is 'always'. If yes, the routine moves to step 403 to initiate the service even if another service wanted to prevent the initiation of others while it is the controlling service.

If the OMPC parameter value of the service is not 'always', the routine checks in step 406 whether its value is 'no'. If it is, the service is not initiated (step 407).

If the OMPC parameter value of the service is not 'always' or 'no', its value is 'maybe'. In such a case, the service can be initiated, if none of the active controlling services prohibits new services from initiating. Therefore, in step 408, the routine takes the first service on the list of the specific data. It is assumed in this example that the first service on the list is the one initiated last. Next, the routine checks in step 409 the ESCS parameter value of the service taken from the list. In step 410, the routine checks whether the ESCS parameter value is 'true' (i.e. initiating new services is not prohibited). If ESCS is not 'true', the service is not initiated (step 407). If ESCS is 'true', the routine checks in step 411 whether there are other services on the list of the specific data or was the ESCS parameter value of the last service just checked. If the service was the last one, the routine moves to step 403 to initiate the service. If the service was not the last one in the specific data, the next service is taken in step 412 and the routine continues from step 409 by checking the ESCS parameter value of the service.

The steps presented above in FIGS. 3 and 4 are not in an absolutely chronological order and some of the steps can be performed simultaneously or differing from the above order. Other functions related to call control and service control, such as meeting event detection points, sending notifications, requesting and receiving instructions, can be performed between the steps. Some of the steps can be left out, such as the steps 306, 307, 308, 309 and 310 of FIG. 3 in an embodiment where the switching centre (switching point) supports several concurrent controlling services, but controls their interworking by detection points. In such a case, the routine can move directly from step 304 and 305 to step 311. It is enough for the operation according to the invention that the multiple control state has two different states, of which one allows the initiation of a controlling service in a trigger situation and the other does not. This value can be determined from one parameter, whether a switching centre (switching point) parameter or a service parameter. The multiple control state can thus be controlled in may ways and using different parameters and parameter combinations. It is also possible that the instruction provided by the service related to initiating new controlling services remains in use even though the connection that provided the instruction changes into a monitoring one or terminates.

Even though the above states that the parameter values used in defining the multiple control state are in the trigger data, the invention is in no way restricted to this alternative. The parameter values can be obtained directly from the state model (control record), or services belonging to a predefined group, e.g. services of a certain protocol (such as CS1), obtain their parameter values directly from the state model (control record) and other services from somewhere else. The parameters related to a service can be maintained in the home location register HLR, from which they can be fetched to the visitor location register and, thus, to the CAMEL subscription information (CSI). The home location register makes it possible to customise the parameter values controlling the multiple control state of the service by each subscriber specifically.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for controlling the initiation an intelligent network service at a switching point, the method comprising:

controlling a call set-up using at least one control record;

defining at least one parameter whose value indicates whether a controlling service can be initiated to control the control record, if a controlling service for the control record has already been initiated;

detecting a situation triggering an initiation of a first controlling service in the control record;

initiating the first controlling service;

detecting a situation triggering an initiation of a second controlling service in the control record;

checking the parameter value; and continuing the initiation of the second controlling service, if the parameter allows the initiation of the second controlling service.

2. The method of claim 1, wherein the parameter is a control parameter associated with the second controlling service and indicating whether the second controlling service can be initiated if the first controlling service has already been initiated.

3. The method of claim 2, further comprising:

defining a preventive parameter, which indicates whether the first controlling service prevents new controlling services from initiating;

indicating by a value of the control parameter also whether a value of the preventive parameter is checked in addition to the control parameter;

if the preventive parameter value is not checked, continuing the initiation of the second controlling service; and if the preventive parameter value is also checked, checking the preventive parameter value and, if the preventive parameter allows the initiation of the second controlling service, continuing the initiation of the second controlling service.

4. The method of claim 1, wherein the parameter is a control parameter associated with the second controlling service and indicating whether the second controlling service can be initiated if, in the situation triggering the initiation of the second controlling service, the first controlling service is being or has been served.

5. The method of claim 4, further comprising:

defining a preventive parameter, which indicates whether the first controlling service prevents new controlling services from initiating;

indicating by a value of the control parameter also whether a value of the preventive parameter is checked in addition to the control parameter;

if the preventive parameter value is not checked, continuing the initiation of the second controlling service; and if the preventive parameter value is also checked, checking the preventive parameter value and, if the preventive parameter allows the initiation of the second controlling service, continuing the initiation of the second controlling service.

6. The method of claim 1, wherein the parameter is a preventive parameter associated with the first controlling service and indicating whether the first controlling service prevents new controlling services from initiating.

7. The method of claim 1, wherein the parameter is a preventive parameter associated with the first controlling service and indicating whether the first controlling service prevents new controlling services from initiating if the first controlling service is being or has been served.

8. The method of claim 1, wherein the parameter is a switching point parameter whose value indicates whether more than one controlling service may control one control record at the switching point.

9. The method of claim 1, wherein the parameter is a switching point parameter whose value indicates whether a second controlling service may be initiated in a situation triggering initiation, which is serving or has served the first controlling service of the switching point.

10. The method of claim 1, wherein the control record is modelled with a state model whose detection point is a situation triggering the initiation of the control record.

11. An intelligent network switching point of a telecommunications system, wherein the intelligent network switching point controls a call using at least one control record;

maintains specific data indicating whether a controlling service has been initiated to control the control record;

has access to interworking data maintained in the telecommunications system, the interworking data including at least one parameter definition, a value of the parameter indicating whether a controlling service can be initiated to control the control record, if a controlling service for the control record has already been initiated; and checks the value of the parameter in response to detecting a situation triggering the initiation of a controlling service, if the specific data indicates that a controlling service has already been initiated to control the control record.

12. The intelligent network service switching point of claim 11, wherein the parameter is associated with a controlling service and the parameter value indicates whether other controlling services may exist with the controlling service to control the control record.

13. The intelligent network service switching point of claim 11, wherein the parameter is a control parameter associated with the controlling service and the interworking data also includes a preventive parameter indicating whether the controlling service prevents new controlling services from initiating, the parameter value also indicates whether the value of the preventive parameter is checked in addition to the control parameter, and the intelligent network service switching point is arranged to check the value of the preventive parameter in response to a control parameter value indicating a check.

14. The intelligent network service switching point of claim 11, wherein the parameter is a switching point parameter whose value indicates whether more than one controlling service may control one control record.

15. The intelligent network service switching point of claim 11, wherein the service switching point maintains specific data for situations triggering the initiation of a controlling service in the control record and checks the parameter value in response to detecting a situation triggering the initiation of a controlling service, if another controlling service is being or has been served.

16. The intelligent network service switching point of claim 11, wherein the intelligent network service switching point maintains the interworking data itself.

17. The intelligent network service switching point of claim 11, wherein the intelligent network service switching point fetches interworking data from a database of the telecommunications system, the database containing subscriber data.

18. The intelligent network service switching point of claim 11, wherein the intelligent network service switching point is part of a mobile system and fetches interworking data from a visitor location register of the mobile system.

* * * * *